UNITED STATES PATENT OFFICE.

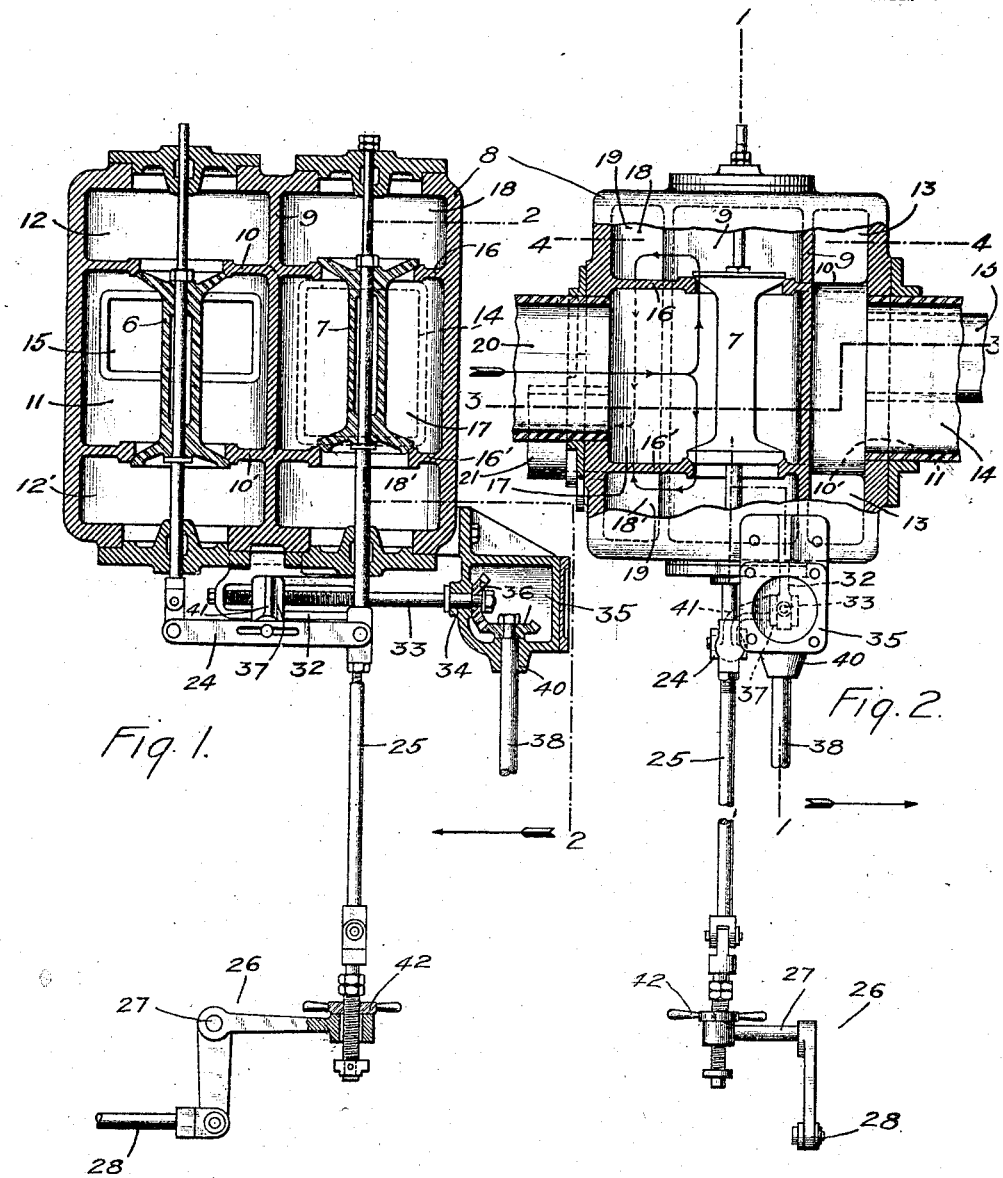

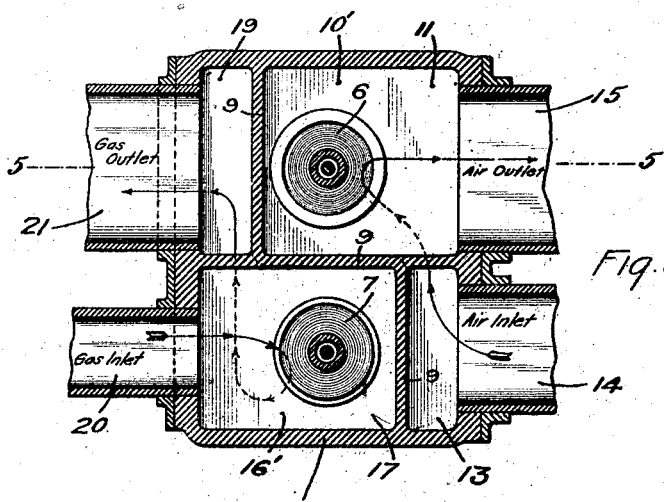
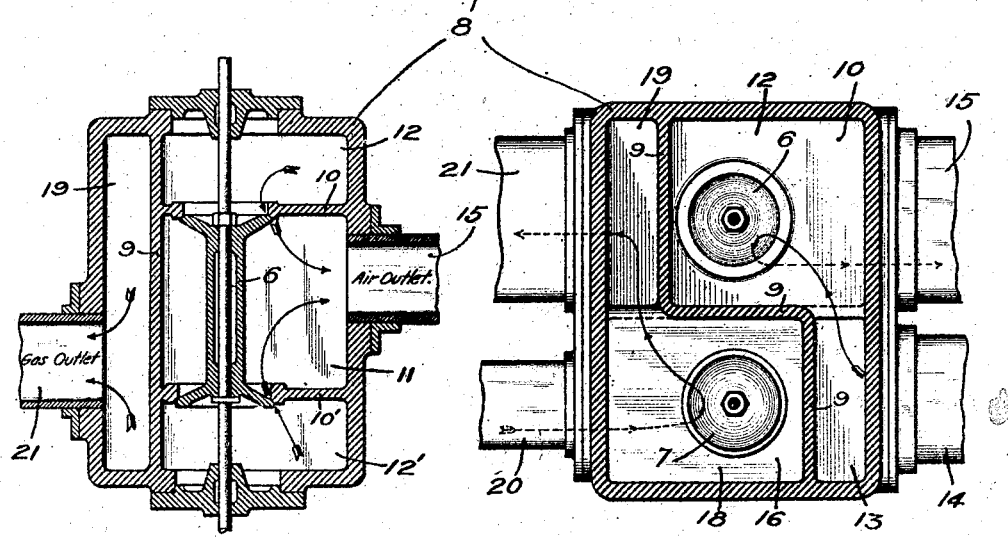

WILLIAM STEAD, OF MANCHESTER, ENGLAND, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

VALVE MECHANISM FOR INTERNAL-COMBUSTION ENGINES.

1,149,002.    Specification of Letters Patent.    Patented Aug. 3, 1915.

Application filed June 21, 1909. Serial No. 503,507.

*To all whom it may concern:*

Be it known that I, WILLIAM STEAD, a subject of the King of Great Britain, and a resident of Manchester, England, have made a new and useful Invention in Valve Mechanism for Internal-Combustion Engines, of which the following is a specification.

This invention relates to internal combustion engines of the kind in which the proportions of the mixture of gas and air supplied to the cylinder after being adjusted in accordance with the nature of the gas or other conditions are maintained constant during the operation of the engine the amount of the mixture admitted to the cylinder being varied by the governor in accordance with the load.

The object of the invention is to provide an improved device for regulating the proportions and amount of the combustible mixture of gas and air supplied to the admission valve or valves in engines of this type in accordance with the load.

According to my invention I provide separate gas and air valves, preferably of the balanced puppet type, the valve stems being connected to a pivoted lever which is operated by means of a governor of any suitable type connected by a linkage with the pivoted lever in such a manner as to vary its position and thereby the amount of the opening of the valves in accordance with the load. In order to adjust the proportions of gas and air in the mixture admitted, I provide means for varying the position of the fulcrum of the pivoted lever so that the relative lifts of the valves may be altered to obtain the best mixture under given conditions.

In order that the invention may be clearly understood I will proceed to describe the same with reference to the accompanying drawings in which:

Figure 1 is a sectional view on the broken line 1—1 of Fig. 2, looking in the direction of the arrow, and illustrates one form of a valve mechanism arranged in accordance with my invention. Fig. 2 is a view partially in elevation and partially in section on the line 2—2 of Fig. 1, looking in the direction of the arrow, the valve being shown in elevation. Fig. 3 is a sectional plan view on the broken line 3—3 of Fig. 2 and illustrates the arrangement of the gas inlet and outlet ports and the air inlet and outlet ports. Fig. 4 is a sectional view on the line 4—4 of Fig. 2. Fig. 5 is a sectional view on the line 5—5 of Fig. 3.

Referring now to the drawings, in the illustrated embodiment of my invention an air valve 6 and a gas valve 7 are shown located in a single casing 8, which is divided into gas and air receiving and delivering chambers by means of suitably arranged partitions and diaphragms. An approximately Z-shaped vertical partition 9, clearly shown in Fig. 4, divides the interior of the casing into two separate compartments one of which receives and delivers air to the engine cylinders, and the other of which receives and delivers gas to the engine cylinders. Diaphragms or horizontal partitions 10 and 10′, in conjunction with a short vertical partition, divide the air compartment into an air delivering chamber 11 and air receiving chambers 12 and 12′ which are respectively located above and below the chamber 11 and which communicate with each other through a vertical passage 13 formed in the casing. The passage 13 is provided with an air inlet port 14 and the chamber 11 is provided with an air delivery port 15, which communicates with the engine cylinders through suitable piping. Diaphragms or horizontal partitions 16 and 16′, in conjunction with a short vertical partition, divide the gas compartment of the casing 8 into a gas receiving chamber 17 and gas delivering chambers 18 and 18′, which are respectively located above and below the chamber 17 and which communicate with each other through a vertical passage 19 formed within the casing. The chamber 17 communicates with a source of gas supply through an inlet port 20 and the passage 19 is provided with a gas outlet port 21 which communicates, through suitable piping, with the engine cylinders.

The air valve 6 is shown as a balanced puppet valve and seats against the diaphragms 10 and 10' and controls the delivery of air from both the chambers 12 and 12' to the delivering chamber 11 and consequently controls the delivery of air to the engine cylinders. The gas valve 7 is shown as a balanced puppet valve and seats upon the diaphragms 16 and 16' and controls the delivery of gas from the chamber 17 to both the chambers 18 and 18'. This valve consequently controls the delivery of gas to the engine cylinders. The currents of air and gas through the casing are clearly shown in Figs. 3, 4 and 5 by means of arrows.

The stems of the valves 6 and 7 are pivotally connected to the opposite ends of a lever 24, one end of which is connected by means of a rod 25 to one arm of the bell-crank lever 26 pivoted at 27, the other arm of the bell-crank lever being connected to the operative member of a governor (not shown) by means of a link 28. The governor may be of any well known type of gas engine governor so arranged that the operation of both the valves is automatically controlled by the governor and the amount of port opening is regulated in accordance with the load.

A bracket 32 is secured to the casing 8 and supports one end of the screw-threaded spindle 33, the other end of which is supported in a bearing 34 formed in a bracket 35 which is also secured to the casing 8. The spindle 33 is actuated by means of bevel gearing 36 by a rod 38, the rotation of which is effected by means of a hand wheel (not shown), and the rod 38 is supported in a bearing 40 formed in the bracket 35. Mounted upon the threaded portion of the spindle 33 is a screw-threaded member 37 which is so formed as to engage a portion of the bracket 32 and to be effectively held against rotation. The member 37 is provided with an arm 41 on which the lever 24 is fulcrumed.

A hand wheel 42 on the rod 25 is provided for the purpose of varying the length of the rod 25 whereby the puppet valves 6 and 7 can be opened or closed for the purpose of starting up the gas engine. A stop may be provided on the screw-threaded portion of the rod 25 so that the hand wheel may be readily brought to the same point when the engine has attained normal speed.

It will be readily understood that the relative amounts of movement of the two valves 6 and 7, that is the throw of the valves may be varied by varying the position of the fulcrum of the lever 24. With this arrangement, the quality of the mixture of gas and air delivered to the engine cylinder can be varied by varying the position of the fulcrum of the lever 24. After the member 37 has been so adjusted that the proper mixture is insured, the amount that the valves 6 and 7 will open, is regulated by the governor, and the speed of the engine is controlled by varying the amount of the charge delivered while the quality of the charge remains constant for all loads.

The adjustment of the fulcrum of the lever 24 is effected by rotating the rod 38, which, through the bevel gearing 36, rotates the screw-threaded rod 33 and thereby moves the member 37, on the arm 41 of which, the lever 24 is fulcrumed. With this arrangement, the quality of the mixture admitted to the engine cylinder may be readily varied while the quantity of the mixture is unaffected and is controlled by the governor as has been described. It will be apparent that the position of the fulcrum of the lever 24 may be varied without affecting or in any way interfering with the operation of the engine to which the valves deliver gas and air. It will also be apparent that by providing balanced gas and air valves and by arranging these valves so that one is raised by the operating lever, while the other is lowered, the effort imposed upon the governor will be comparatively small and that the governor may be made very sensitive. In addition to this, my device is very simple and is not liable to get out of order and the use of puppet valves render it strong and reliable.

It will be understood that the invention is not limited to the particular arrangement for varying the position of the fulcrum of the valve operating lever and that various modifications in the construction may be made without departing from the spirit and scope of my invention.

Having now described my invention, what I claim is:

1. A valve, comprising a casing provided with passages for delivering air and gas to engine cylinders, positively actuated balanced puppet valves for respectively controlling the delivery of fluid to the air and gas passages, a governor actuated lever pivotally connected at its ends to the stems of said valves so that one valve moves in one direction while the other valve moves in the opposite direction, and manually adjustable means for shifting the fulcrum of said lever to vary the throw of the valves.

2. In a device of the class described, a casing provided with an air-delivery chamber having an outlet, air-receiving chambers located above and below said air-delivery chamber, said receiving chambers having inlets and communicating with the delivery chamber, a gas-receiving chamber having an inlet, gas-delivery chambers located above and below said receiving chamber and communicating with the gas-receiving chamber and having an outlet for connection with the gas engine and valves for controlling the delivery of gas and air to said engine, said valves being within the casing and controlling the delivery of fluid from the separate receiving chambers to the respective delivery chambers.

In testimony whereof, I have hereunto subscribed my name this eighth day of June, 1909.

WILLIAM STEAD.

Witnesses:
J. C. BOATFLOWER,
N. H. SHEARD.